United States Patent
Singh et al.

(10) Patent No.: US 11,518,237 B2
(45) Date of Patent: Dec. 6, 2022

(54) FLUID TANK SYSTEM

(71) Applicant: CNH Industrial America LLC, New Holland, PA (US)

(72) Inventors: Samrendra Singh, Bolingbrook, IL (US); Panos Tamamidis, Mount Prospect, IL (US); Bin Lou, Bolingbrook, IL (US); Kaushal Ghorpade, Chicago, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 322 days.

(21) Appl. No.: 16/773,408

(22) Filed: Jan. 27, 2020

(65) Prior Publication Data

US 2021/0229546 A1 Jul. 29, 2021

(51) Int. Cl.
  *B60K 15/03* (2006.01)
  *B60K 15/035* (2006.01)
(52) U.S. Cl.
  CPC .. *B60K 15/035* (2013.01); *B60K 2015/03552* (2013.01); *B60K 2015/03576* (2013.01)
(58) Field of Classification Search
  CPC ........... B60K 2015/03552; B60K 2015/03576; B60K 2015/03105; B60K 2015/0344; B60K 15/03; B60K 15/035; Y10T 137/86212; Y10T 137/479; Y10T 137/86228
  USPC ....................................................... 220/563
  See application file for complete search history.

(56) References Cited

U.S. PATENT DOCUMENTS

| | | | |
|---|---|---|---|
| 3,477,611 A | * | 11/1969 | Niles ...................... B60K 15/03 220/202 |
| 3,643,690 A | | 2/1972 | Sarai |
| 3,907,153 A | | 9/1975 | Mutty |
| 4,142,647 A | | 3/1979 | Walters |
| 4,699,638 A | | 10/1987 | Harris |
| 4,701,198 A | * | 10/1987 | Uranishi .......... B60K 15/03504 96/148 |
| 4,724,861 A | | 2/1988 | Covert et al. |
| 4,874,020 A | | 10/1989 | Bucci |
| 4,887,578 A | | 12/1989 | Woodcock et al. |
| 4,974,645 A | | 12/1990 | Johnson |
| 5,131,439 A | * | 7/1992 | Bucci ..................... B60K 15/04 141/285 |
| 5,404,906 A | | 4/1995 | Aoshima et al. |
| 5,570,672 A | | 11/1996 | Kunimitsu et al. |
| 5,687,778 A | * | 11/1997 | Harris .................. B67D 7/3227 141/59 |
| 5,704,337 A | | 1/1998 | Stratz et al. |
| 6,158,456 A | | 12/2000 | Enge |
| 8,667,985 B2 | | 3/2014 | Grillmeier et al. |
| 9,592,730 B2 | | 3/2017 | Revink et al. |

(Continued)

*Primary Examiner* — King M Chu
(74) *Attorney, Agent, or Firm* — Rebecca Henkel; Rickard DeMille

(57) ABSTRACT

A fluid tank that includes a housing. The housing includes a bottom wall, a top wall, and a side wall. The side wall couples the bottom wall to the top wall to define a cavity that receives and houses a liquid. A conduit guides liquid from a fluid source into the cavity. The conduit defines an inlet and an outlet. The outlet couples to the side wall. A vent coupled to the housing and to the conduit. The vent defines a vent inlet coupled to the housing and a vent outlet coupled to the conduit. The vent discharges gas from the housing into the conduit.

20 Claims, 5 Drawing Sheets

(56) References Cited

U.S. PATENT DOCUMENTS

| | | |
|---|---|---|
| 9,849,775 B2 | 12/2017 | Eberhardt et al. |
| 2007/0261752 A1* | 11/2007 | McClung ............... F16L 11/20 138/140 |
| 2015/0210528 A1* | 7/2015 | Marsala ............... B67D 7/048 141/46 |
| 2018/0326838 A1 | 11/2018 | Wolf |

* cited by examiner

FLUID TANK SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

The agricultural industry uses a variety of tools and machines to harvest crops. For example, a combine harvester is a machine that uses a thresher to harvest grains, such as wheat and barley. Other equipment used by the agricultural industry may include tractors that pull planters, seed drills, plow, among others. These tractors and harvesters typically generate power using diesel engines. Unfortunately, diesel engines may produce gaseous emissions that include nitrogen oxides. In order to reduce nitrogen oxides in emissions, vehicles may use a diesel exhaust fluid (DEF). DEF is an aqueous urea solution. In operation, the DEF is injected into the exhaust line where it catalytically reduces nitrogen oxides into water and nitrogen lowering the output of nitrogen oxide emissions.

BRIEF DESCRIPTION

This brief description is provided to introduce a selection of concepts that are further described below in the detailed description. This summary is not intended to identify key or essential features of the claimed subject matter, nor is it intended to be used as an aid in limiting the scope of the claimed subject matter.

In one example, a fluid tank that includes a housing. The housing includes a bottom wall, a top wall, and a side wall. The side wall couples the bottom wall to the top wall to define a cavity that receives and houses a liquid. A conduit guides liquid from a fluid source into the cavity. The conduit defines an inlet and an outlet. The outlet couples to the side wall. A vent coupled to the housing and to the conduit. The vent defines a vent inlet coupled to the housing and a vent outlet coupled to the conduit. The vent discharges gas from the housing into the conduit.

In another example, a fluid tank that includes a housing. The housing includes a bottom wall, a top wall, and a side wall. The side wall couples the bottom wall to the top wall to define a cavity that receives and houses a liquid. A conduit guides liquid from a fluid source into the cavity. The conduit defines a conduit inlet and a conduit outlet. The conduit outlet couples to the side wall. A vent extends through the conduit and into the housing and discharges gas from the housing through the conduit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
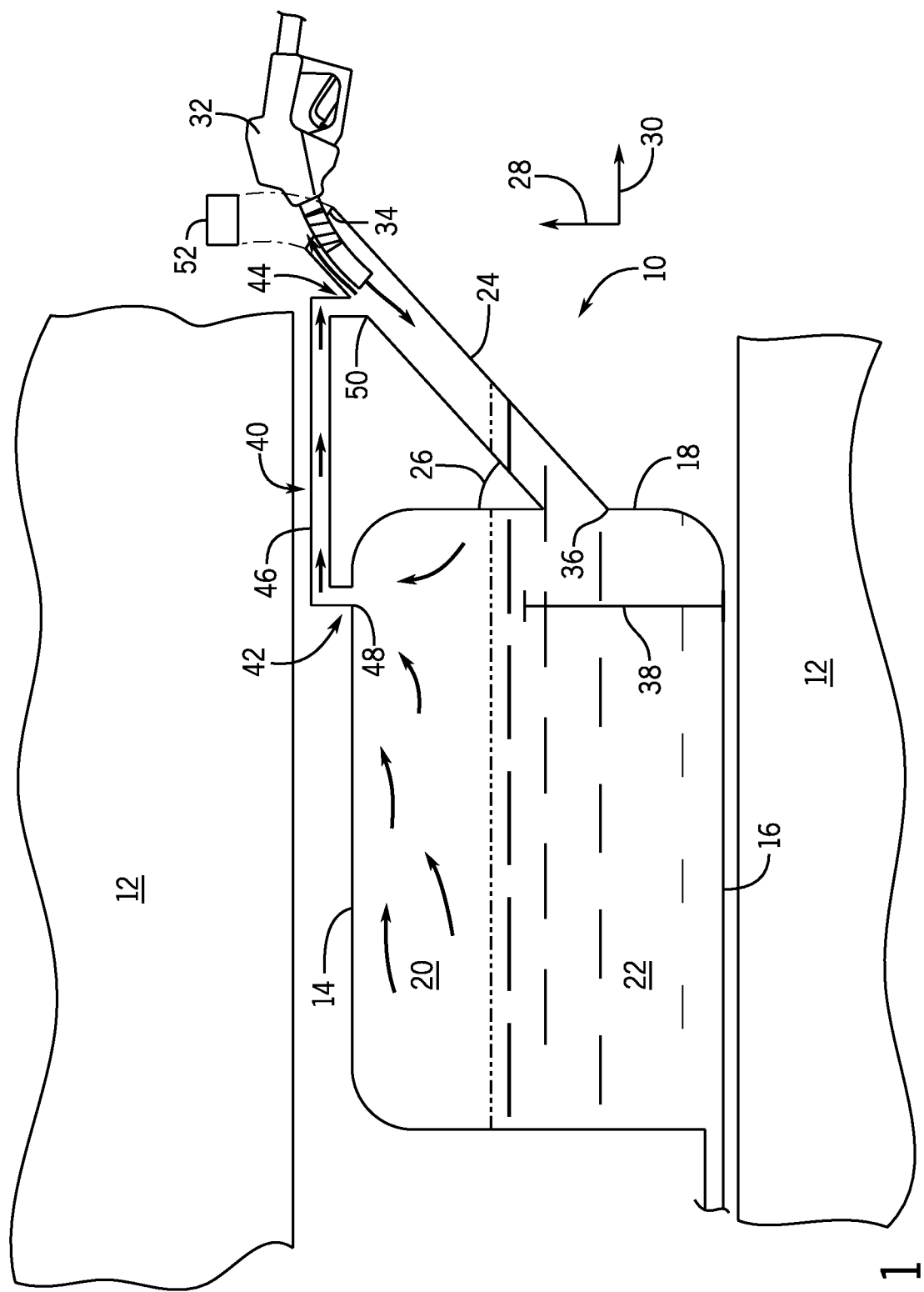
FIG. 1 is a cross-sectional view of a diesel exhaust fluid tank, in accordance with an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Harvesters and tractors are typically self-propelled vehicles with an internal combustion engine. These internal combustion engines are typically diesel engines. Diesel engines ignite a fuel air mixture by mechanically compressing the mixture until combustion. In order to reduce soot production and to exhaust the fuel, diesel engines inject excess air into the chamber to ensure complete or near complete combustion of the fuel. This may be referred to as a lean burn. Unfortunately, the excess air enables nitrogen oxides to form in the exhaust gas. To reduce the amount of nitrogen oxides released into the environment a diesel exhaust fluid (DEF) may be injected into the exhaust line to catalytically reduce the nitrogen oxides into other substances. For example, an aqueous urea solution may be injected into the exhaust line. In the exhaust line the aqueous urea vaporizes to form ammonia and carbon dioxide. The nitrogen oxides react with the ammonia to form water and nitrogen, which is then expelled by the vehicle.

Harvesters, tractors, and other vehicles that use diesel engines may therefore include a DEF tank to store the diesel exhaust fluid for use during operation. Unfortunately, there may be limited space on diesel vehicles. The limited space may block filling of the DEF tank through the top of the DEF tank. The DEF tank may therefore be filled through a side surface. Unfortunately, filling a tank with liquid through a side surface may increase the fill time or reduce the fill capacity of the tank as air is unable to escape once the liquid fills the tank above the liquid inlet to tank. However, providing an aperture or other outlet in the top of the tank exposes the aqueous urea solution to evaporation. Evaporation changes the ratio of water to urea in the solution, which may affect the catalytic reaction.

The description below describes a DEF tank with a vent that vents gases from the DEF tank through a liquid fill conduit on the tank. The DEF tank described below may therefore use a single cap to provide access for filling the DEF tank and to block/reduce evaporation of the DEF.

FIG. 1 is a cross-sectional view of a DEF tank 10. As illustrated, the DEF tank 10 may be placed on a vehicle 12 in a position that blocks filling of the DEF tank 10 through a top wall 14 of the tank 10. The tank 10 includes the top wall 14, a bottom wall 16, and a side wall 18 that extends vertically between the bottom wall 16 and the top wall 14. The side wall 18 may form a variety of shapes including square, rectangular, circular, oval, among others. Together the top wall 14, bottom wall 16, and side wall 18 form a cavity 20 that receives a diesel emission fluid (DEF) 22. The DEF 22 enters through a conduit 24 that couples only to the side wall 18 or a combination of the side wall 18 and the bottom wall 16. The conduit 24 forms an acute angle 26 with the side wall 18 that enables the conduit 24 to extend vertically and laterally in directions 28, 30 to facilitate access to and coupling of the conduit 24 to a DEF source 32. The conduit 24 defines a liquid inlet 34 that receives the DEF 22 and a liquid outlet 36 that enables the DEF 22 to flow into the cavity 20.

To fill the DEF tank 10, the DEF 22 is pumped into the tank 10 through the conduit 24. As the DEF 22 fills the cavity 20, the DEF 22 fills the tank to a level 38 that is above the outlet 36. As explained above, once the DEF 22 fills the tank 10 to a level that covers the outlet 36, the liquid may block gases (e.g., air) in the tank 10 from easily escaping through the conduit 24. The tank 10 therefore includes the vent 40 that enables the gases in the tank 10 to escape as the tank 10 fills. The vent 40 includes a vent inlet portion 42, a vent outlet portion 44, and a vent conduit portion 46. As illustrated, the vent 40 couples to the top wall 14 at a vent inlet portion 42. As the tank 10 fills, the gases in the tank 10 enter the vent inlet portion 42 and flow through the vent conduit portion 46 to the vent outlet portion 44. The vent outlet portion 44 couples to the conduit 24 with an outlet 50 enabling gases in the tank 10 to discharge into the atmosphere. The flow of gases into and out of the tank 10 is controlled with a cap 52, which also controls the flow of liquid DEF 22 into the tank 10. In this way, the flow of gas and liquid may be controlled with a single cap 52 that may be readily accessible to an operator. By controlling the flow of gases with the cap 52, the tank 10 is able to reduce or block evaporation of water in the aqueous urea solution. As explained above, evaporation changes the ratio of water to urea in the solution and may therefore affect the catalytic reaction.

In some embodiments, the vent inlet portion 42 and the vent outlet portion 44 may be angled relative to the vent conduit portion 46 in order to block or reduce DEF 22 from entering the vent conduit portion 46. For example, the vent outlet portion 44 may be parallel to the bottom wall 16 to block or reduce DEF 22 flowing through conduit 24 from entering the vent conduit portion 46. In other words, the vent inlet portion 42 and the vent outlet portion 44 may be oriented relative to the conduit 24 and/or the top wall 14 so that any DEF 22 entering the vent conduit portion 46 has to flow vertically in direction 28 before entering the vent conduit portion 46. By blocking or reducing the ability of DEF 22 from entering the vent conduit portion 46, the tank 10 is able to block or reduce clogging of the vent conduit 46 with urea or other particulate in the DEF 22 (e.g., urea that comes out of solution).

Figure 2:
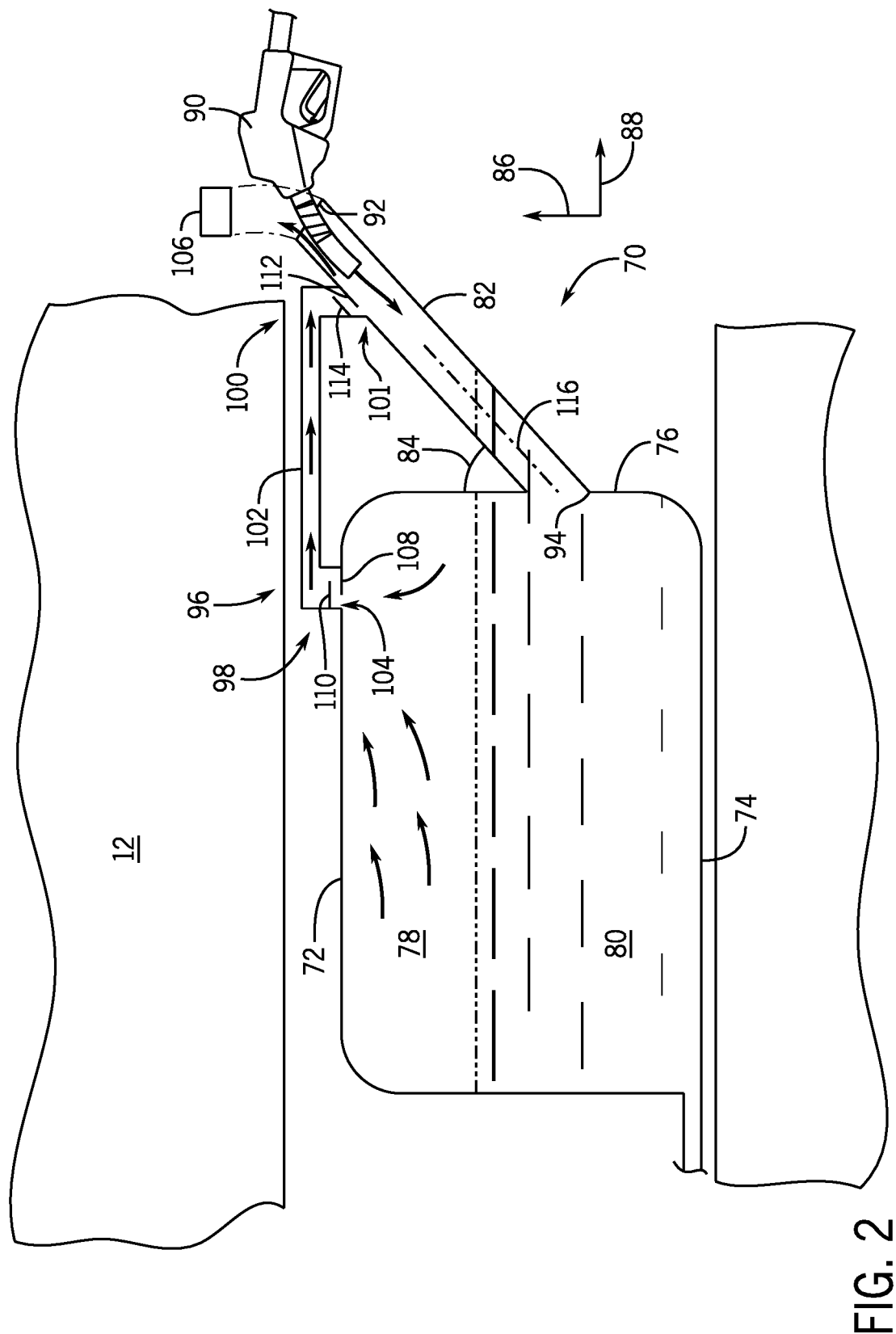
FIG. 2 is a cross-sectional view of a diesel exhaust fluid tank, in accordance with an embodiment of the present disclosure.

FIG. 2 is a cross-sectional view of a tank 70 (e.g., DEF tank). As illustrated, the tank 70 may be placed on the vehicle 12. As explained above, the vehicle 12 may block filling of the tank 70 through a top wall 72. The tank 70 includes the top wall 72, a bottom wall 16, and a side wall 76 that extends vertically between the bottom wall 74 and the top wall 72. The side wall 76 may form a variety of shapes. Together the top wall 72, bottom wall 74, and side wall 76 form a cavity 78 that receives a diesel emission fluid (DEF) 80. The DEF 80 enters through a conduit 82 that couples only to the side wall 76 or a combination of the side wall 76 and the bottom wall 74. The conduit 82 forms an acute angle 84 with the side wall 76 that enables the conduit 82 to extend vertically and laterally in directions 86, 88 to facilitate access to and coupling of the conduit 82 to a DEF source 90. The conduit 82 defines a liquid inlet 92 that receives the DEF 80 and a liquid outlet 94 that enables the DEF 80 to flow into the cavity 78.

As explained above, once the DEF 80 fills the tank 70 to a level that covers the outlet 94, the DEF may block gases (e.g., air) in the tank 70 from easily escaping through the conduit 82. The tank 70 therefore includes the vent 96 that enables the gases in the tank 70 to escape as the tank 70 fills. The vent 96 includes a vent inlet portion 98, a vent outlet portion 100, and a vent conduit portion 102. As illustrated, the vent inlet portion 98 couples to the top wall 72 and defines a vent inlet 104. As the tank 70 fills, the gases in the tank 70 enter the vent inlet portion 98 and flow through the vent conduit portion 102 to the vent outlet portion 100. The vent outlet portion 100 couples to the conduit 82 with an outlet 101 enabling the gas in the tank 70 to discharge into the atmosphere. The flow of gas into and out of the tank 70 is controlled with a cap 106, which also controls the flow of liquid DEF 22 into the tank 70. As explained above, the flow of gas and liquid may be controlled with a single cap 106 that may be readily accessible to an operator. By controlling the flow of gases with the cap 106, the tank 70 is able to reduce or block evaporation of water in the aqueous urea solution.

In some embodiments, the vent inlet portion 98 and/or the vent outlet portion 100 may include baffles to reduce or block the flow of DEF 80 into the vent conduit portion 102. For example, the vent inlet portion 98 may include a first baffle 108 and a second baffle 110. The baffles 108 and 110 overlap along axis 88 and are offset from each other in direction 86. During operation of the vehicle 12, the DEF 80 may slosh around in the tank 70. The baffles 108 and 110 are configured to reduce the movement of DEF 80 into the vent conduit portion 102 while still enabling gases to escape the tank through the vent 96. The vent outlet portion 100 may also include baffles 112 and 114 that block or reduce the flow of DEF 80 into the vent conduit portion 102 while filling. The baffles 112 and 114 may overlap along an axis 116 of the conduit 82 while also being offset from one another in a direction that is perpendicular or substantially perpendicular to the axis 116. In some embodiments, the baffle 112 may form part of the conduit 82. In still other embodiments, the baffle 112 may be upstream from the baffle 114 in the direction DEF 80 flows into the conduit 82. By blocking or reducing the ability of DEF 80 to enter the vent conduit portion 102, the tank 70 is able to block or reduce clogging of the vent conduit portion 102 with urea or other particulate in the DEF 80 (e.g., urea that comes out of solution).

Figure 3:
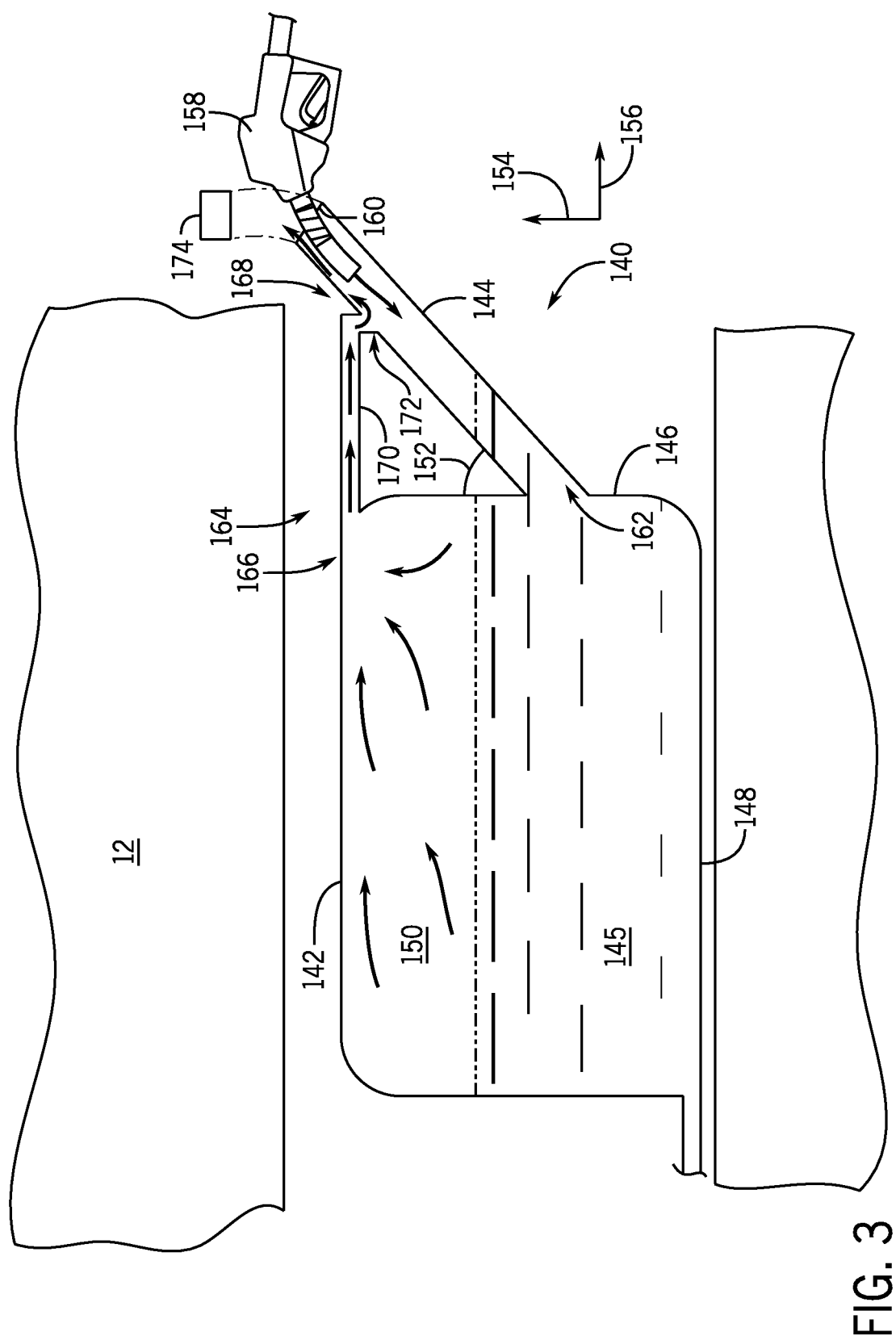
FIG. 3 is a cross-sectional view of a diesel exhaust fluid tank, in accordance with an embodiment of the present disclosure.

FIG. 3 is a cross-sectional view of a DEF tank 140 on the vehicle 12. The position of the DEF tank 140 on the vehicle 12 may block filling of the DEF tank 140 through a top wall 142. The tank 140 there includes a conduit 144 that receives diesel emission fluid (DEF) 145. The conduit 144 couples only to a side wall 146 or a combination of the side wall 146 and a bottom wall 148. Together the top wall 142, the bottom wall 148, and the side wall 146 form a cavity 150 that receives DEF 145 from the conduit 144. The conduit 144 forms an acute angle 152 with the side wall 146 that enables the conduit 144 to extend vertically and laterally in directions 154, 156 to facilitate access to and coupling of the conduit 144 to a DEF source 158. The conduit 144 defines a liquid inlet 160 that receives the DEF 145 and a liquid outlet 162 that enables the DEF 145 to flow into the cavity 150.

As explained above, once the DEF 145 fills the tank 140 to a level that covers the outlet 162, the DEF 145 may block gases (e.g., air) in the tank 140 from easily escaping through the conduit 144. The tank 140 therefore includes the vent 164 that enables the gases in the tank 140 to escape as the tank 140 fills. The vent 164 includes a vent inlet 166, a vent outlet portion 168, and a vent conduit portion 170. As illustrated, the vent inlet 166 couples to the top wall 142 and to the side wall 146. As the tank 140 fills, the gases in the tank 140 flow through the vent inlet 166 and into the vent conduit portion 170. The gases then flow through the vent conduit portion 170 to the vent outlet portion 168. The vent outlet portion 168 couples to the conduit 144 with an outlet 172 enabling the gas in the tank 140 to discharge into the atmosphere. The flow of gases into and out of the tank 140 is controlled with a cap 174, which also controls the flow of liquid DEF 145 into the tank 140. As explained above, the flow of gases and liquid may be controlled with a single cap 174. By controlling the flow of gases with the cap 174, the tank 140 is able to reduce or block evaporation of water in the aqueous urea solution.

As illustrated, the vent outlet portion 168 may be angled relative to the vent conduit portion 170 in order to block or reduce DEF 145 from entering the vent conduit portion 170. For example, the vent outlet portion 168 may be parallel to or substantially parallel to the side wall 146 to block or reduce DEF 145 flowing through the conduit 144 from entering the vent conduit portion 170. In other words, the vent outlet portion 168 may be oriented relative to the vent conduit portion 170, top wall 142, and/or the bottom wall 148 so that any DEF 145 flowing through the conduit 144 has to flow vertically in direction 154 before entering the vent conduit portion 170.

Figure 4:
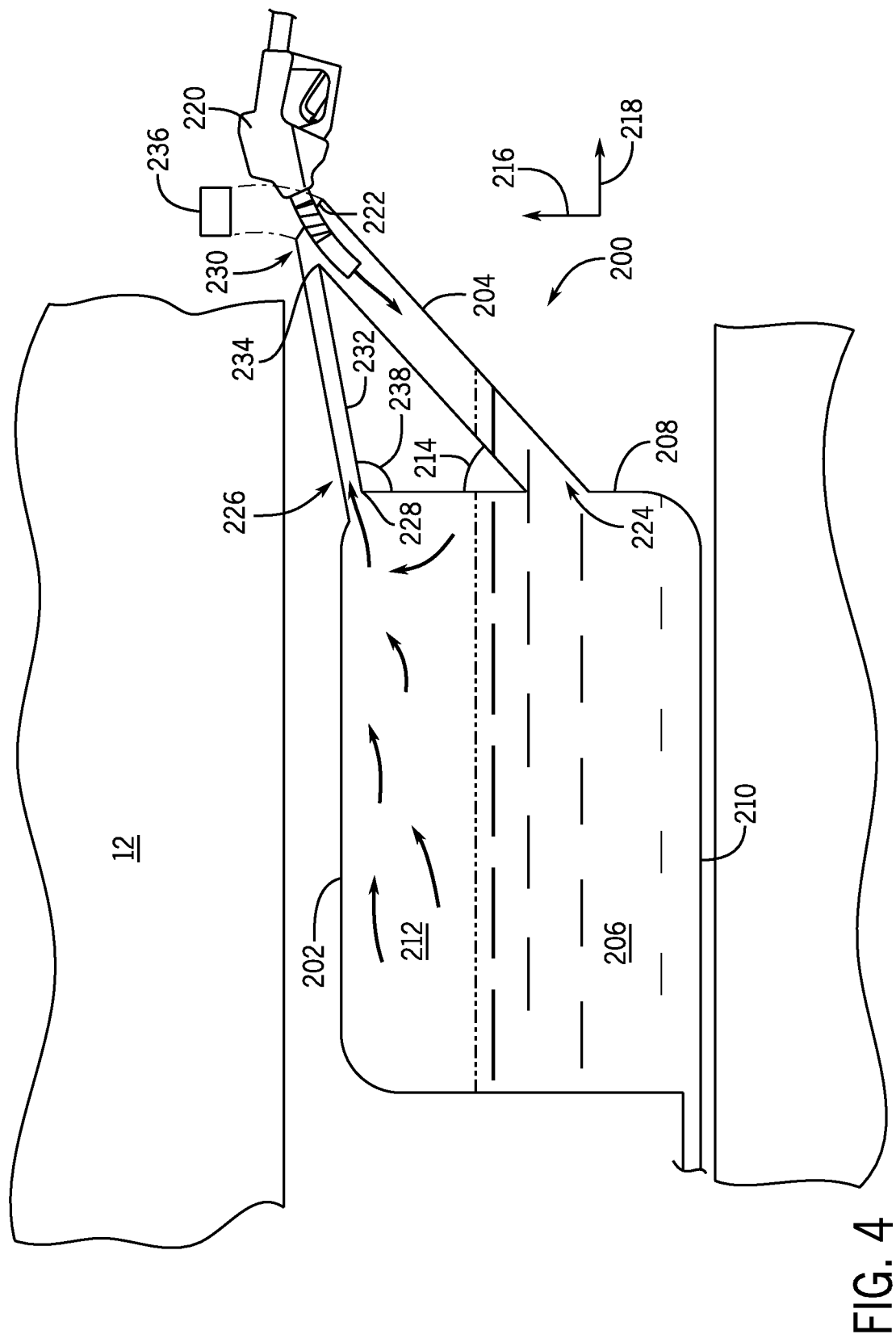
FIG. 4 is a cross-sectional view of a diesel exhaust fluid tank, in accordance with an embodiment of the present disclosure.

FIG. 4 is a cross-sectional view of a tank 200 (e.g., DEF tank) on the vehicle 12. The position of the tank 200 on the vehicle 12 may block filling of the tank 200 through a top wall 202. The tank 200 therefore includes a conduit 204 that receives diesel emission fluid (DEF) 206. The conduit 204 couples only to a side wall 208 or a combination of the side wall 208 and a bottom wall 210. Together the top wall 202, bottom wall 210, and side wall 208 form a cavity 212 that receives the DEF 206 from the conduit 204. The conduit 204 forms an acute angle 214 with the side wall 208 that enables the conduit 204 to extend vertically and laterally in directions 216, 218 to facilitate access to and coupling of the conduit 204 to a DEF source 220. The conduit 204 defines a liquid inlet 222 that receives the DEF 206 and a liquid outlet 224 that enables the DEF 206 to flow into the cavity 212.

As explained above, once the DEF 206 fills the tank 200 to a level that covers the liquid outlet 224, the liquid may block gases (e.g., air) in the tank 200 from easily escaping through the conduit 204. The tank 200 therefore includes the vent 226 that enables the gases in the tank 200 to escape as the tank 200 fills. The vent 226 includes a vent inlet 228, a vent outlet portion 230, and a vent conduit portion 232. As illustrated, the vent inlet 228 couples to the top wall 202 and to the side wall 208. As the tank 200 fills, the gases in the tank 200 flow through the vent inlet 228 and into the vent conduit portion 232. The gases then flow through the vent conduit portion 232 to the vent outlet portion 230. The vent outlet portion 230 couples to the conduit 204 with an outlet 234 enabling the gases in the tank 200 to discharge into the atmosphere. The flow of gases into and out of the tank 200 is controlled with a cap 236, which also controls the flow of liquid DEF 206 into the tank 200. As explained above, the flow of gas and liquid may be controlled with a single cap 236. By controlling the flow of gases with the cap 236, the tank 200 is able to reduce or block evaporation of water in the aqueous urea solution.

As illustrated, the vent 226 may be angled relative to the side wall 208 in order to block or reduce DEF 206 from remaining in the vent 226. For example, the vent 226 may form an angle 238 that is greater than ninety degrees. The angle 238 of the vent 226 enables DEF 206 that enters the vent 226 to be pulled by gravity back into the tank 210.

Figure 5:
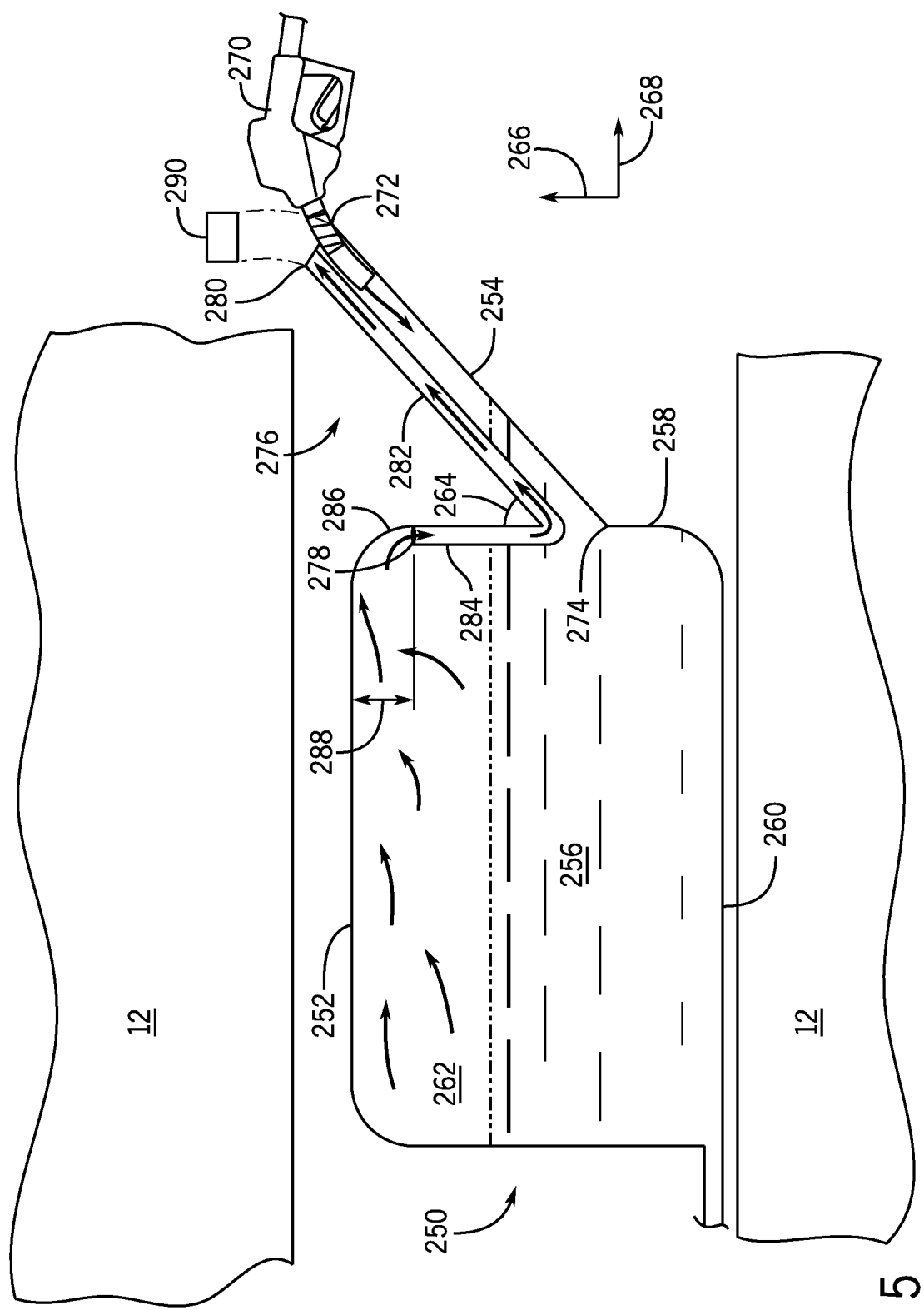
FIG. 5 is a cross-sectional view of a diesel exhaust fluid tank, in accordance with an embodiment of the present disclosure.

FIG. 5 is a cross-sectional view of a tank 250 (e.g., DEF tank) on the vehicle 12. The position of the tank 250 on the vehicle 12 may block filling of the tank 250 through a top wall 252. The tank 250 therefore includes a conduit 254 that receives diesel emission fluid (DEF) 256. The conduit 254 couples only to a side wall 258 or a combination of the side wall 258 and a bottom wall 260. Together the top wall 252, the bottom wall 260, and the side wall 258 form a cavity 262 that receives the DEF 256 through the conduit 254. The conduit 254 forms an acute angle 264 with the side wall 258 that enables the conduit 254 to extend vertically and laterally in directions 266, 268 to facilitate access to and coupling of the conduit 254 to a DEF source 270. The conduit 254 defines a conduit inlet 272 that receives the DEF 256 and a liquid outlet 274 that enables the DEF 256 to flow into the cavity 262.

As explained above, once the DEF 256 fills the tank 250 to a level that covers the liquid outlet 274, the liquid may block gases (e.g., air) in the tank 250 from easily escaping through the conduit 254. The tank 250 therefore includes the vent conduit 276 that enables gases in the tank 250 to escape as the tank 250 fills. As illustrated, the vent conduit 276 extends through the conduit 254 and into the cavity 262. The vent conduit 276 includes a vent inlet 278 and a vent outlet 280. In operation, gases enter the vent inlet 278 and flow through the vent conduit 276 before discharging through the vent outlet 280 positioned proximate the conduit inlet 272. The vent conduit 276 includes a first portion 282 that extends through the conduit 254 and a second portion 284 that extends into the cavity 262 of the tank 250. In some embodiments, the first portion 282 may couple to the conduit 254 and the second portion 284 may couple to an interior surface 286 of the side wall 258. In order to block or reduce DEF 256 from entering the vent conduit 276, the vent inlet 278 may be within a distance 288 of the top wall 252. This distance may be 1-20%, 1-15%, 1-10% of the length of the side wall 258.

The flow of gas into and out of the tank 250 is controlled with a cap 290 that also controls the flow of liquid DEF 256 into the tank 250. As explained above, the flow of gases out of and liquid into the tank 250 may be controlled with a single cap 290. By controlling the flow of gases with the cap 290, the tank 250 is able to reduce or block evaporation of water in the aqueous urea solution. As explained above, evaporation changes the ratio of water to urea in the solution and may therefore affect the catalytic reaction.

Technical effects of the invention include venting gas from a tank to facilitate filling of the tank with liquid through a side wall. Another effect is the ability to close an outlet and an inlet of a tank with a single cap.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A fluid tank, comprising:
   a housing comprising:
     a bottom wall;
     a top wall; and
     a side wall coupling the bottom wall to the top wall to define a cavity that receives and houses a liquid;
   a conduit configured to guide the liquid from a fluid source into the cavity, the conduit defines an inlet and an outlet, wherein the outlet couples to the side wall; and
   a vent coupled to the housing and to the conduit, wherein the vent defines a vent inlet coupled to the housing and a vent outlet coupled to the conduit, and wherein the vent is configured to discharge gas from the housing into the conduit;
   wherein the vent comprises an inlet portion and a vent conduit portion, the vent inlet is positioned at the inlet portion, the inlet portion comprises a first inlet baffle and a second inlet baffle, and the first inlet baffle and the second inlet baffle overlap in a first direction and are offset in a second direction.

2. The fluid tank of claim 1, comprising a cap configured to couple to the inlet of the conduit to block a flow of the liquid into and the gas out of the fluid tank.

3. The fluid tank of claim 1, wherein the vent couples to the top wall.

4. The fluid tank of claim 1, wherein the inlet portion is angled relative to the vent conduit portion.

5. The fluid tank of claim 1, wherein the vent comprises an outlet portion, and wherein the outlet portion is angled relative to the vent conduit portion.

6. The fluid tank of claim 5, wherein the outlet portion comprises a first outlet baffle and a second outlet baffle.

7. The fluid tank of claim 6, wherein the first outlet baffle and the second outlet baffle overlap in a third direction and are offset in a fourth direction.

8. The fluid tank of claim 1, wherein the vent couples to the side wall.

9. The fluid tank of claim 1, wherein the vent defines a central axis, and wherein the central axis is parallel to the top wall.

10. The fluid tank of claim 1, wherein the vent defines a central axis, and wherein the central axis is perpendicular to the side wall.

11. The fluid tank of claim 1, wherein the vent defines a central axis, and wherein the central axis forms an obtuse angle with the side wall.

12. A fluid tank, comprising:
    a housing comprising:
      a bottom wall;
      a top wall; and
      a side wall coupling the bottom wall to the top wall to define a cavity that receives and houses a liquid;
    a conduit configured to guide the liquid from a fluid source into the cavity, the conduit defines a conduit inlet and a conduit outlet, wherein the conduit outlet couples to the side wall; and
    a vent having a first portion and a second portion, wherein the first portion extends through the conduit, the second portion extends into the housing, the second portion couples to an interior surface of the side wall and extends upwardly from the first portion along the side wall toward the top wall, and the vent is configured to discharge gas from the housing through the conduit.

13. The fluid tank of claim 12, wherein the vent defines a vent inlet and a vent outlet.

14. The fluid tank of claim 13, wherein the vent outlet is flush with the conduit inlet.

15. The fluid tank of claim 12, wherein the vent defines a first cross-sectional area the conduit defines a second cross-sectional area, and the second cross-sectional area is greater than the first cross-sectional area.

16. The fluid tank of claim 13, wherein a distance between the vent outlet and an interior surface of the top wall is less than ten percent of a height of the side wall.

17. A fluid tank, comprising:
    a housing comprising:
      a bottom wall;
      a top wall; and a side wall coupling the bottom wall to the top wall to define a cavity that receives and houses a liquid;

a conduit configured to guide the liquid from a fluid source into the cavity, wherein the conduit extends between a conduit inlet opening and a conduit outlet opening, and the conduit couples to the housing; and a vent extending through the conduit and configured to discharge gas from the housing through the conduit, wherein the vent extends between a vent inlet opening and a vent outlet opening, and the vent outlet opening is flush with the conduit inlet opening.

18. The fluid tank of claim 17, comprising a cap configured to selectively cover the vent outlet opening and the conduit inlet opening.

19. The fluid tank of claim 17, wherein a distance between the vent outlet opening and an interior surface of the top wall is less than ten percent of a height of the side wall.

20. The fluid tank of claim 17, wherein the vent defines a first cross-sectional area, the conduit defines a second cross-sectional area, and the second cross-sectional area is greater than the first cross-sectional area.

\* \* \* \* \*